April 28, 1936.　　　A. O. BECKMAN　　　2,038,706
INKING REEL
Filed May 8, 1934

Inventor
Arnold O. Beckman
By Lyon&Lyon
Attorneys

Patented Apr. 28, 1936

2,038,706

UNITED STATES PATENT OFFICE 2,038,706

INKING REEL

Arnold O. Beckman, Altadena, Calif., assignor, by mesne assignments, to National Technical Laboratories, Pasadena, Calif., a corporation of California Application May 8, 1934, Serial No. 724,517

2 Claims. (Cl. 197—171)

This invention relates to a reel provided with means for maintaining a ribbon wound thereon supplied with a sufficient amount of inking substance.

It is one of the principal objects of this invention to provide a reel with means which will act to maintain a new ribbon wound thereon supplied with a sufficient amount of inking substance to prevent impressions taken therefrom when used in a typewriter, adding machine, or other printing device, from gradually becoming lighter in quality of color. In other words a color quality of impressions printed through the ribbon will be of substantially the same high standard of quality throughout the life of the ribbon. By the use of this reel the life of the ordinary inking ribbon is increased many times.

A further object is to provide the reel with means which will quickly, and, of even more importance, evenly distribute the inking substance throughout the length of the ribbon.

And a further object is to provide such a device which will be easily and cheaply manufactured, easily and cleanly handled by the operator, and easily and cleanly replenished with the inking substance.

Other objects and advantages of the invention will be apparent as the nature of the same is more fully understood from the following description of the accompanying drawing.

Figure 1:
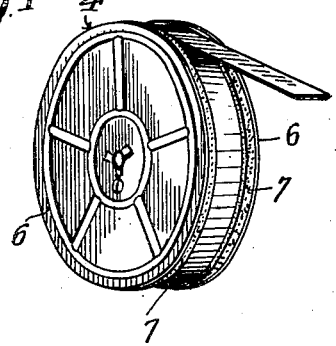
Figure 1 illustrates a perspective of the invention.
Figure 2:
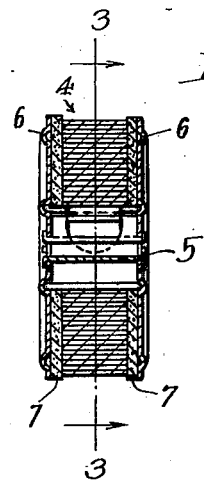
Figure 2 illustrates an end view of Fig. 1.
Figure 3:
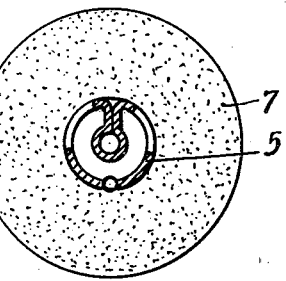

While Figure 3 illustrates a sectional view taken substantially in the plane of line 3—3 of Fig. 2 of the device after the ribbon has been removed therefrom.

In a preferred embodiment of the invention as shown in the drawing, a spool or reel 4 may be of the usual form used in typewriters or other ribbon printing machines. The reel may be constructed of pressed metal and may include a center hub 5, and spaced side flanges 6 fastened to the opposite ends of the hub. The particular construction of the reel is not a feature of this invention and it may be of any of the common types now in use on such machines.

The means for supplying the ribbon wound upon the reel with an inking substance may include an absorbent disc 7 suitably fastened to the inner face of each of the reel flanges. A felt disc has been found to be ideal for this purpose.

The absorbent discs may next be moistened with any suitable ink substance which may or not include a color matter.

Now the device is ready for use and may be preferably employed with a new ribbon, however, an old ribbon may be re-inked by winding it upon the reel.

As the ribbon is slowly wound upon the spool the edges thereof will contact with one or both of the moistened discs 7, thus the edges of the ribbon will become moistened and by capillary attraction the ink substance will spread across the full width thereof and in this way the ink substance will be evenly spread along the entire length of the ribbon. The wrapping of the ribbon upon itself, while being wound upon the spool, will also assist in an even distribution of the ink.

The ink feeding disc 7 may be remoistened with the ink substance from time to time as needed.

From the above description, it will be appreciated that my re-inking reel will maintain the ribbon fully inked whereby the impressions taken therefrom will be of uniform color quality throughout the life of the ribbon.

It has been found in actual practice that a ribbon used in connection with my invention will have a useful life many times that of a similar ribbon when used on the ordinary spools, and by applying the ink substance to the edges of the ribbon, the ribbon does not become overly saturated with the inking substance, which is an important feature of this invention.

Having fully described a preferred form of the invention, it is to be understood that the foregoing description is for illustrative purposes only and I do not desire to be limited by any of the details shown or described, except as defined in the appended claims.

I claim:

1. An inking reel having spaced flanges for receiving therebetween an inking ribbon, and provided with an inking disc mounted upon the inner face of each flange for feeding ink to each edge of the ribbon, each of said inking discs presenting an unbroken surface to the adjacent edges of the ribbon.

2. An inking reel having spaced flanges for receiving therebetween an inking ribbon, and provided with ink feeding means associated with each flange for feeding ink to the adjacent edge of the ribbon, each of said ink feeding means presenting an unbroken surface to the adjacent edges of the ribbon.

ARNOLD O. BECKMAN.